N. L. Blanchard.
Liquid Meter.
No. 102,650.  Patented May 3, 1870.
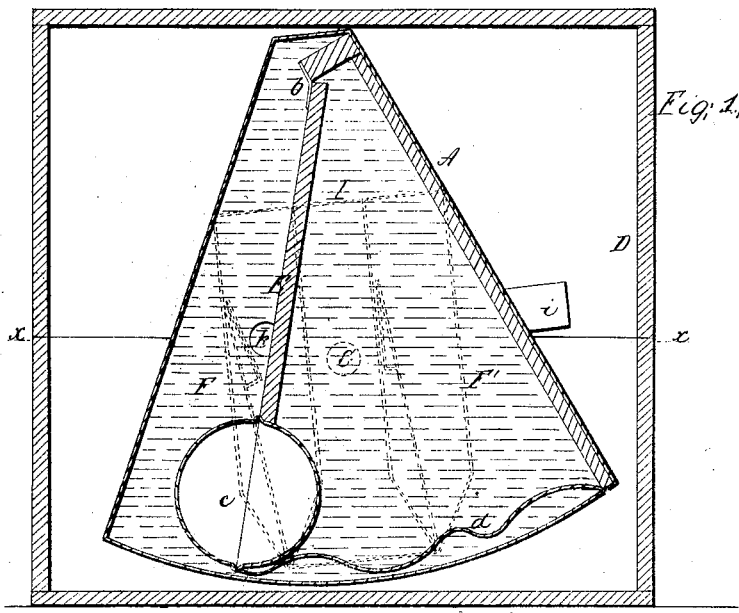
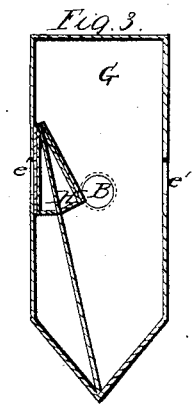
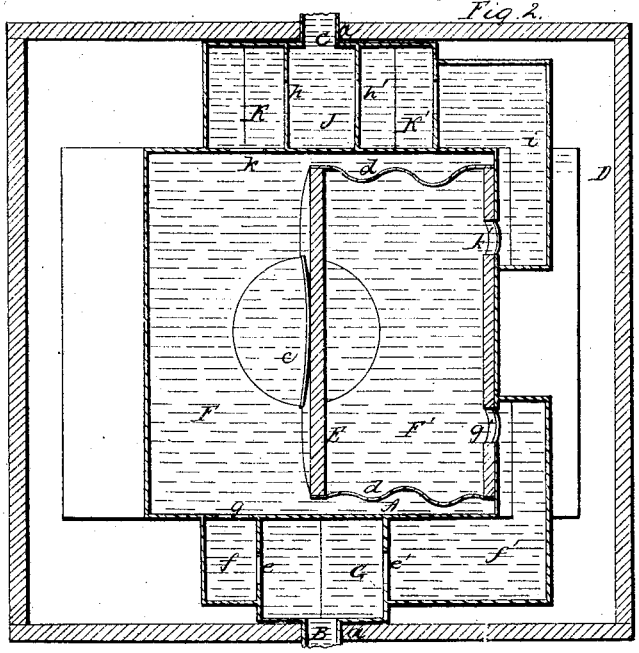
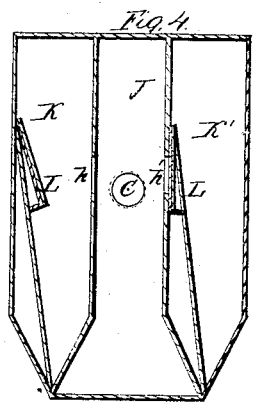
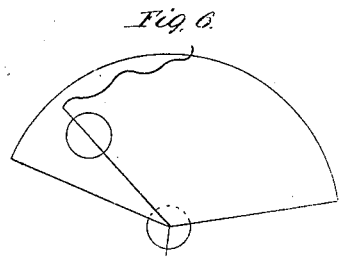
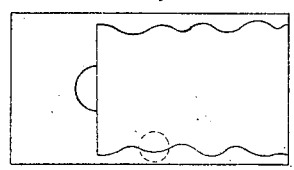
Witnesses,
Fred. Haynes
J. W. Coombs
Inventor,
N. L. Blanchard

United States Patent Office.

NATHANIEL L. BLANCHARD, OF SPUYTEN DUYVIL, NEW YORK.

Letters Patent No. 102,650, dated May 3, 1870; antedated April 25, 1870.

IMPROVEMENT IN LIQUID-METERS.

The Schedule referred to in these Letters Patent and making part of the same.

*To all whom it may concern:*

Be it known that I, NATHANIEL L. BLANCHARD, of Spuyten Duyvil, in the county of Westchester and State of New York, have invented a new and useful Improvement in Liquid-Meters, of which the following is a full, clear, and exact description, reference being had to the accompanying drawing forming part of this specification, and in which—

Figure 1 represents a central transverse section of a liquid-meter, constructed in accordance with my improvement;

Figure 2, a sectional plan through the line $x\,x$ in fig. 1, with the valves removed; and Figures 3 and 4, interior views of the receiving and delivery valve-boxes, with their valves.

Figures 5 and 6 are diagrams in illustration of certain modifications.

Similar letters of reference indicate corresponding parts.

My improvement relates to that description of meters in which a measure, operated by the weight of the liquid passing through it, is made to tilt or tip alternately in reverse directions, to keep up, through suitable valves, the supply to and discharge from the measure, which is arranged to lie on or over opposite sides of the tilting-axis.

To thus operate the measure I arrange within the latter a movable diaphragm, or partial diaphragm, of such specific gravity and bulk as to be capable of flotation within the fluid, and, accordingly as it is moved to either side of the axial line of the measure, so that it will displace a sufficient body of the fluid as to secure an excess of weight on the opposite side of the measure to effect the tilting of it, through the weight of the fluid, as contradistinguished from the weight of the diaphragm.

This diaphragm is connected with the measure by a flexible attachment, in such manner as to divide the measure into separate chambers, each of which is provided with suitable inlets and outlets and valves, preferably operating by their own gravity, to change, by the tilting of the measuring-chamber or chambers, through the displacement effected by the diaphragm, the flow of the liquid into and out of said chambers alternately.

Referring to figs. 1, 2, 3, and 4 of the drawing—

A is the measure, which may be made of any suitable form.

B and C are the tilting or rocking-trunnions to said measure, resting in bearings $a\,a$ of a box or case, D.

The one, B, of these trunnions forms the inlet, and the other trunnion, C, the outlet to the measure.

E is the movable diaphragm, which is here shown as hinged at $b$, and as made up in part or carrying a light hollow ball or structure, $c$, to secure to said diaphragm capacity for flotation in and displacement of the liquid to effect the tilting of the measure by weight of the liquid, as hereinafter described. I do not restrict myself to any particular form of diaphragm, and, in some cases, may dispense with the hollow ball or appendage $c$, by constructing the diaphragm generally of sufficient lightness and bulk as to effect the same result.

The diaphragm E is connected with the one side of the measure A by a flexible strip or strips, $d$, which divide the measure into separate measuring-chambers, F and F'.

On the one end of the measure A is a receiving valve-box, G, with which the inlent-trunnion B is in open communication, and which is provided with side apertures $e\,e'$ that connect, by branches $f\,f'$ through apertures $g\,g'$, the one with the measuring-chamber F, and the other with the measuring-chamber F'.

Within this valve-box G is a double flap-valve, H, which, accordingly as the measure A is tilted, closes and opens alternately the side apertures $e\,e'$.

On the opposite end of the measure A is a delivery valve-box, I, divided into compartments J and K K', the central one, J, of which is in open communication with the outlet-trunnion C, also, by apertures $h\,h'$, with the adjacent compartments K K'.

These latter compartments connect, by a branch, $i$, and apertures $k\,k'$, the one with the measuring-chamber F, and the other with the measuring-chamber F', and are provided with flap-valves L L', that, accordingly as the measure A is tilted, open and close alternately the apertures $h\,h'$. These flap-valves L L', also the flap-valve H, are designed to operate by their gravity, and ball-valves, as an equivalent, under a suitable construction of passages, may be substituted for them.

From this description it will be seen that liquid, entering by the inlet B, will flow into the one measuring-chamber F or F', and out of the other of said chambers, according to the open or closed position of the valves H and L L', through the tilting of the measure A, relatively to the apertures $e\,e'$ and $h\,h'$, and that the tilting of the measure alternately to opposite sides is effected by the flotation of the diaphragm E in and displacement of the liquid by it alternately on opposite sides of the axial line of the measure, which gives a superior or excess of weight of liquid on the side of the measure opposite to that to which the diaphragm has been moved, which excess of liquid tips or tilts the measure A, and so reverses the action or flow. This is in nowise equivalent to a diaphragm operating by its weight to tip or tilt the meter, and admits of a more direct connection of the passages, but is not applicable to measuring æriform fluids.

Both chambers F F' of the measure A, it should be observed, are designed to be constantly filled with liquid.

Said tilting-measure may be connected with any suitable registering device.

It will be apparent that the form of the measure and of the diaphragm, with its flexible connection, may be varied without departure from the principle of my invention; thus they may be of cylindrical configuration, as represented in the diagram, fig. 5, or the measure may be in the form of a section of a sphere, and the flexible strip of the diaphragm be made fast at its edges to the measure, intermediately of its width in the one direction, as indicated in the diagram, fig. 6.

What is here claimed, and desired to be secured by Letters Patent, is—

1. The combination, with a tilting or rocking-measure, of a pendent diaphragm, provided with a bulb or hollow chamber, $c$, arranged and operating to displace a portion of the liquid, so as to cause the measure to be tilted by the greater weight of liquid on the opposite side of the tilting axis of the measure to that occupied by said diaphragm, substantially as specified.

2. The arrangement, with relation to the tilting-measure and its pendent diaphragm, constructed as described, of valves operating by their own gravity, in the manner shown and described, for the purpose set forth.

3. The combination and arrangement of the tilting-measure A, the pendent diaphragm E, the rocking inlets and outlets B C, with the valve-boxes G I, and valves H and L L' therein, and the apertures and branches $e\ e'$, $g\ g'$, $f\ f'$, $h\ h'$, $k\ k'$, and $i$, substantially as shown and described.

NATH. L. BLANCHARD.

Witnesses:
FRED. HAYNES,
J. W. COOMBS.